United States Patent
Kosugi

(10) Patent No.: US 11,381,341 B2
(45) Date of Patent: Jul. 5, 2022

(54) RECEPTION APPARATUS, TRANSMISSION APPARATUS, RECEPTION METHOD, AND TRANSMISSION METHOD

(71) Applicant: Panasonic Intellectual Property Management Co., Ltd., Osaka (JP)

(72) Inventor: Masanori Kosugi, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 36 days.

(21) Appl. No.: 16/160,106

(22) Filed: Oct. 15, 2018

(65) Prior Publication Data

US 2019/0132081 A1 May 2, 2019

(30) Foreign Application Priority Data

Oct. 31, 2017 (JP) .............................. JP2017-210644
Jun. 12, 2018 (JP) .............................. JP2018-111859

(51) Int. Cl.
*H04L 1/00* (2006.01)
*H04W 4/80* (2018.01)

(52) U.S. Cl.
CPC .......... *H04L 1/0063* (2013.01); *H04L 1/0041* (2013.01); *H04L 1/0045* (2013.01); *H04L 1/0061* (2013.01); *H04W 4/80* (2018.02); *H04L 1/0075* (2013.01)

(58) Field of Classification Search
CPC ... H04L 1/0063; H04L 1/0061; H04L 1/0045; H04L 1/0041; H04L 1/0075; H04W 4/80
See application file for complete search history.

(56) References Cited

U.S. PATENT DOCUMENTS

| 5,446,744 A * | 8/1995 | Nagasawa ........... G11B 20/1833 |
| | | 348/466 |
| 6,246,693 B1 * | 6/2001 | Davidson ................. H04L 1/08 |
| | | 370/445 |
| 2013/0097474 A1 * | 4/2013 | Hwang ............. H03M 13/6516 |
| | | 714/776 |
| 2013/0117638 A1 | 5/2013 | Yang et al. |
| 2016/0198311 A1 * | 7/2016 | Kwon ..................... H04W 4/06 |
| | | 370/312 |

FOREIGN PATENT DOCUMENTS

JP 2014-533032 A 12/2014

OTHER PUBLICATIONS

"LoRaWAN 1.1 Specification", Oct. 11, 2017, LoRa Alliance Technical Committee.

* cited by examiner

*Primary Examiner* — April Y Blair
*Assistant Examiner* — Rong Tang
(74) *Attorney, Agent, or Firm* — Seed IP Law Group LLP

(57) ABSTRACT

A reception apparatus includes a receiver and circuitry. The receiver receives, from a transmission apparatus, a plurality of packets that include code word symbols which include an information word symbol and a parity symbol. The information word symbol is generated from transmission information. The parity symbol is calculated from the information word symbols. The circuitry decodes the code word symbols that are included in the plurality of packets. The number of first packets and the number of second packets among the plurality of packets are shared between the transmission apparatus and the reception apparatus. Each of the first packets includes the information word symbol. Each of the second packets includes the parity symbol.

9 Claims, 12 Drawing Sheets

100

200

RECEPTION APPARATUS, TRANSMISSION APPARATUS, RECEPTION METHOD, AND TRANSMISSION METHOD

The present application claims the benefit of foreign priority of Japanese patent application 2017-210644 filed on Oct. 31, 2017 and Japanese patent application 2018-111859 filed on Jun. 12, 2018, the contents all of which are incorporated herein by reference.

BACKGROUND

1. Technical Field

The present disclosure relates to a reception apparatus, a transmission apparatus, a reception method, and a transmission method.

2. Description of the Related Art

Internet-of-Things (IoT) equipment, compared with a mobile terminal such as a smartphone, is further miniaturized, has smaller amount of data traffic, and shows a tendency towards being placed even at a location where power supply is difficult. Under the situation where such pieces of IoT equipment come into wide use, there is an increasing expectation for a new wireless communication technology called a Low Power Wide Area (LPWA) which can cover a wide area at a low power consumption, of which LoRa (a registered trademark) is a typical example (for example, LoRaWan specification V1.1).

SUMMARY

An aspect of the present disclosure facilitates providing a reception apparatus, a transmission apparatus, a reception method and a transmission method, which are capable of suitably performing communication in an LPWA.

A reception apparatus according to an aspect of the present disclosure includes a receiver and circuitry. The receiver receives, from a transmission apparatus, a plurality of packets that include code word symbols which include an information word symbol and a parity symbol. The information word symbol is generated from transmission information. The parity symbol is calculated from the information word symbols. The circuitry decodes the code word symbols that are included in the plurality of packets. The number of first packets and the number of second packets among the plurality of packets are shared between the transmission apparatus and the reception apparatus. Each of the first packets includes the information word symbol. Each of the second packets includes the parity symbol.

A reception apparatus according to another aspect of the present disclosure includes a receiver and circuitry. The receiver receives, from a transmission apparatus, a plurality of packets that include code word symbols that include an information word symbol and a parity symbol. The information word symbol is generated from transmission information. The parity symbol is calculated from the information word symbol. The circuitry decodes the code word symbols that are included in the plurality of packets. Each of the plurality of packets includes a flag that indicates which of the information word symbol and the parity symbol a symbol that is included in the packet is.

A transmission apparatus according to still another aspect of the present disclosure includes circuitry and a transmitter. The circuitry generates a plurality of packets that include code word symbols that include an information word symbol and a parity symbol. The information word symbol is generated from transmission information. The parity symbol is calculated from the information word symbol. The transmitter transmits the plurality of packets to a reception apparatus. The number of first packets and the number of second packets among the plurality of packets are shared between the transmission apparatus and the reception apparatus. Each of the first packets includes the information word symbol. Each of the second packets includes the parity symbol.

A transmission apparatus according to still another aspect of the present disclosure includes circuitry and a transmitter. The circuitry generates a plurality of packets that include code word symbols that include an information word symbol and a parity symbol. The information word symbol is generated from transmission information. The parity symbol is calculated from the information word symbol. The circuitry sets a flag that indicates which of the information word symbol and the parity symbol a symbol that is included in each of the plurality of packets is. The transmitter transmits the plurality of packets each of which includes the flag, to a reception apparatus.

A reception method according to still another aspect of the present disclosure includes receiving and decoding. In the receiving, a plurality of packets that include code word symbols that include an information word symbol and a parity symbol are received from a transmission apparatus. The information word symbol is generated from transmission information. The parity symbol is calculated from the information word symbol. In the decoding, the code word symbols that are included in the plurality of packets are decoded. The number of first packets and the number of second packets among the plurality of packets are shared between the transmission apparatus and a reception apparatus. Each of the first packets includes the information word symbol. Each of the second packets includes the parity symbol.

A reception method according to still another aspect of the present disclosure includes receiving and decoding. In the receiving, a plurality of packets that include code word symbols that include an information word symbol and a parity symbol are received from a transmission apparatus. The information word symbol is generated from transmission information. The parity symbol is calculated from the information word symbol. In the decoding, the code word symbols that are included in the plurality of packets are decoded. Each of the plurality of packets includes a flag that indicates which of the information word symbol and the parity symbol a symbol that is included in the packet is.

A transmission method according to still another aspect of the present disclosure includes generating and transmitting. In the generating, a plurality of packets that include code word symbols that include an information word symbol and a parity symbol are generated. The information word symbol is generated from transmission information. The parity symbol is calculated from the information word symbol. In the transmitting, the plurality of packets are transmitted to a reception apparatus. The number of first packets and the number of second packets among the plurality of packets are shared between a transmission apparatus and the reception apparatus. Each of the first packets includes the information word symbol. Each of the second packets includes the parity symbol.

A transmission method according to still another aspect of the present disclosure includes generating, setting, and transmitting. In the generating, a plurality of packets that include code word symbols that include an information word symbol and a parity symbol are generated. The information word symbol is generated from transmission information. The parity symbol is calculated from the information word symbol. In the setting, a flag is set. The flag indicates which of the information word symbol and the parity symbol a symbol that is included in each of the plurality of packets is. In the transmitting, the plurality of packets each of which includes the flag are transmitted to a reception apparatus.

A generic or specific exemplary embodiment may be realized as a system, an apparatus, a method, an integrated circuit, a computer, program, or a recording medium, and may be realized as any combination of a system, an apparatus, a method, an integrated circuit, a computer, program, and a recording medium.

According to an aspect of the present disclosure, communication can be suitably performed in the LPWA.

Further advantages and effects according to the aspect of the present disclosure are apparent from the specification and the drawings. At least one of the advantage and the effect is provided by features that are described and illustrated in several exemplary embodiments and the specification, and the drawings, respectively, but both do not necessarily need to be provided in order to obtain one or more features that are the same.

DETAILED DESCRIPTIONS

Figure 1:
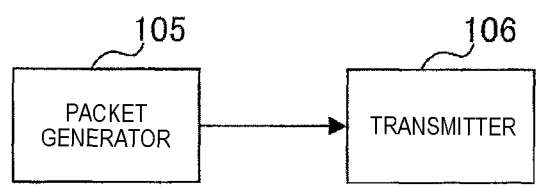
FIG. 1 is a block diagram illustrating a configuration of a portion of transmission apparatus according to a first exemplary embodiment.

Problems in the related art are briefly described before describing exemplary embodiments according to the present disclosure. A communication method in an LPWA has not been sufficiently studied.

The exemplary embodiment according to the present disclosure will be described in detail below with reference to the drawings.

When digital data communication is performed, data is divided into blocks called packets according to characteristics of a channel. In the LPWA, one of the characteristics is that a data rate is low, and generally, one packet ranges in size from ten-odd bytes to several tens of bytes. For this reason, in order to transmit data that is 100 bytes or more in size, the data needs to be divided into a plurality of packets.

A method of efficiently performing communication when dividing communication data into a plurality of packets for transmission during communication that uses the LPWA will be described below.

LPWAs can be broadly categorized according to two types of communication schemes. One is a type of communication scheme that uses a licensed band in which a license to perform communication is necessary, and the other is a type of communication that uses an unlicensed band in which a license to perform communication is unnecessary. In communication that uses the latter, the unlicensed band (for example, a 920 MHz band in Japan), the license is unnecessary, but, when communication is performed in Japan, there is a need to comply with provisions that are prescribed by Association of Radio Industries and Businesses (ARIB).

At this point, there is LoRa (a registered trademark) that is one type of communication scheme which uses the unlicensed band in the LPWA.

LoRa is based on standardized specifications that are proposed by LoRa Alliance, which are called LoRaWAN (a registered trademark) in a data link layer. In LoRa, the degree of freedom to install a gateway or a terminal is high and the cost of a module is low as well. However, when performing communication in Japan according to LoRa, there is a need to comply with the provisions prescribed by ARIB, and, for example, there are restrictions such as a successive transmission time of 400 ms and a transmission interval of 4000 ms (more precisely, a duty ratio of 1:10).

When complying with the above-described restrictions in Lora, for example, limitations are present such as a limitation that only a payload of maximum 11 bytes can be secured per one packet in a setting such as a spreading factor (SF) 10. For this reason, in Lora, although transmission information that is on the order of several hundreds to several kilo bytes is transmitted, the transmission information is divided into a plurality of packets for transmission. Furthermore, because the payload is small in size per a packet, even addition of header information of several bytes causes high overhead.

Furthermore, in LPWA, due to the above-description restriction in transmission, there are limitations such as a limitation that downlink communication cannot be frequently performed or that data transmission cannot be performed freely at any timing. As a method of solving the limitation, application of application layer (AL) FFC (forward error correction in an application layer) is considered.

When an error is detected on the receiving side, a method of correcting an error by making a request to the transmission side for retransmission is generally used, but in a case where retransmission control is difficult to perform, a method called forward error correction (FEC) is applied. As the FEC, there are low-density parity check (LDPC) and the like. With the FEC, a correction code (redundant data) is added on the transmitting side in addition to transmission data, and thus it is possible that a correction is made to some degree on the receiving side. The FECs can be categorized into AL-FEC and physical layer FEC (PHY-FEC) according to a layer to apply. The AL-FEC is a technology that results from applying the FEC to an application layer, and application data that is lost due to packet loss or the like is restored on a per-packet basis. Furthermore, the PHY-FEC is a technology that results from applying the FEC to a physical layer, and transfer data that is damaged due to fading or the like is restored on a per-bit basis.

The AL-FEC is compatible with an environment where a limitation is imposed on the downlink communication as with the LPWA or an environment where the division into the packet frequently occurs, and is a function that is considerably effective for the LPWA.

However, taking into consideration the restriction in the payload size per a packet in the LPWA, there is a need to suppress the header information dedicated for the AL-FEC as much as possible, when the AL-FEC is applied in the LPWA. That is, in packet transmission that uses the LPWA, there is a need to suppress the header information dedicated for the AL-FEC and to secure much more of a payload area to which the transmission information is actually allocated.

Accordingly, according to an aspect of the present disclosure, a method of suppressing the header information dedicated for the AL-FEC and suitably performing communication that uses the LPWA is described.

First Exemplary Embodiment

Outline of a Communication System

A communication system according to an exemplary embodiment of the present disclosure includes transmission apparatus 100 and reception apparatus 200.

Transmission apparatus 100 and reception apparatus 200 according to the exemplary embodiment of the present disclosure divides the communication data into blocks called symbols and stores them in packets. Generally, one symbol is stored in one packet, but it is also possible that a plurality of symbols are stored in one packet.

FIG. 1 is a block diagram illustrating a configuration of a portion of transmission apparatus 100 according to the exemplary embodiment of the present disclosure. In transmission apparatus 100 illustrated in FIG. 1, packet generator 105 generates a plurality of packets that include the code word symbols that are made up of information word symbols which are generated from the transmission information and parity symbols which are calculated from the information word symbol, and transmitter 106 transmits the plurality of packets to reception apparatus 200.

Figure 2:
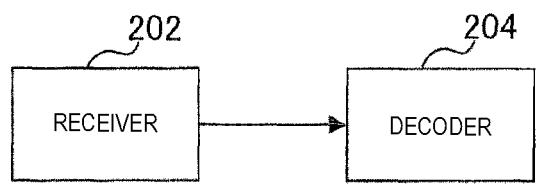
FIG. 2 is a block diagram illustrating a portion of a reception apparatus according to the first exemplary embodiment.

FIG. 2 is a block diagram illustrating a portion of reception apparatus 200 according to the exemplary embodiment of the present disclosure. In reception apparatus 200 that is illustrated in FIG. 2, receiver 202 receives the plurality of packets that include the code word symbols that are made up of the information word symbols which are generated from the transmission information, and the parity symbols which are calculated from the information word symbol, from transmission apparatus 100, and decoder 204 decodes the code word symbols that are included in the plurality of packets.

The number (K described below) of first packets each of which includes the information word symbol, and the number (M described below) of second packets each of which includes the parity symbol, among the plurality of packets, are shared between transmission apparatus 100 and reception apparatus 200.

Configuration of Transmission Apparatus

Figure 3:
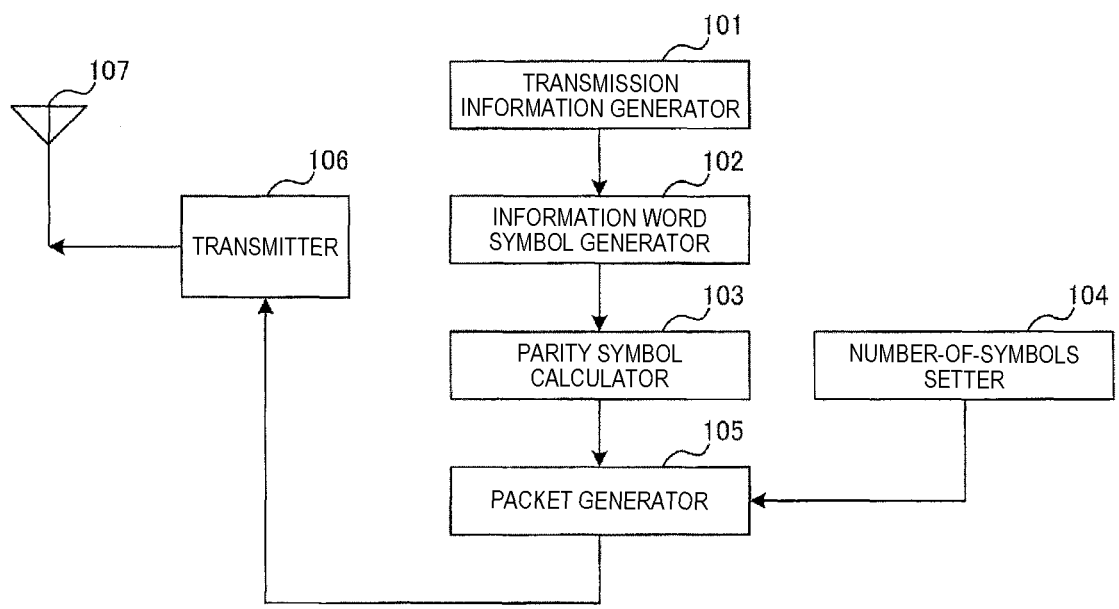
FIG. 3 is a block diagram illustrating a configuration of the transmission apparatus according to the first exemplary embodiment.

FIG. 3 is a block diagram illustrating a configuration of transmission apparatus 100 according to the exemplary embodiment. Transmission apparatus 100, for example, transmits data (the transmission information) to reception apparatus 200 in compliance with a communication scheme for the LPWA (LoRa or the like).

In FIG. 3, transmission apparatus 100 includes transmission information generator 101, information word symbol generator 102, parity symbol calculator 103, number-of-symbols setter 104, packet generator 105, transmitter 106, and antenna 107.

Transmission information generator 101 generates the transmission information destined for reception apparatus 200, and outputs the transmission information to information word symbol generator 102. For example, the transmission information is sensing information or the like indicating a result of sensing in a sensor (not illustrated). The transmission information is not limited to sensing information.

Information word symbol generator 102 generates at least one information word symbol (a valid packet) that is included in the code word symbol, using the transmission information that is input from transmission information generator 101. Information word symbol generator 102 outputs the generated information word symbol to parity symbol calculator 103.

Parity symbol calculator 103 calculates the parity symbol (redundant symbol) using the information word symbol that is input from information word symbol generator 102. The LDPC, for example, or any other error correction method may be applied to a method (more precisely, a method that uses the AL-FEC) of calculating the parity symbol in parity symbol calculator 103. Parity symbol calculator 103 outputs the information word symbol and the calculated parity symbol to packet generator 105.

In this manner, the code word symbols include at least one information word symbol that is generated from the transmission information, and at least one parity symbol that is calculated from the information word symbol.

Number-of-symbols setter 104 sets the number (hereinafter expressed as "K") of information word symbols that constitute the code word symbol, and the number (hereinafter expressed as "M") of parity symbols that constitute the code word symbol. That is, the number of all the packets, in each of which the code word symbol is transmitted, is (K+M). Number-of-symbols setter 104 outputs number-ofpackets information indicating the number (a values of K and M) of symbols that is set, to packet generator 105.

Before transmitting the code word symbol (the transmission information), for example, packet generator 105 generates a packet that includes the number-of-packets information which is input from number-of-symbols setter 104, and outputs the generated packet to transmitter 106.

Furthermore, packet generator 105 generates a plurality of packets that include the code word symbols (the information word symbols or the parity symbols) that are input from parity symbol calculator 103. For example, packet generator 105 adds the header information to the payload which includes the code word symbol, and thus generates each packet. Packet generator 105 outputs the plurality of the generated packets to transmitter 106.

Transmitter 106 performs transmission processing on the packet that is input from packet generator 105, and transmits the resulting packet to reception apparatus 200 via antenna 107. For example, in LoRa, transmitter 106 performs packet transmission according to the provisions that specify restrictions such as the successive transmission time of 400 ms and the transmission interval of 4000 ms (more precisely, a duty ratio of 1:10).

Configuration of Reception Apparatus

Figure 4:
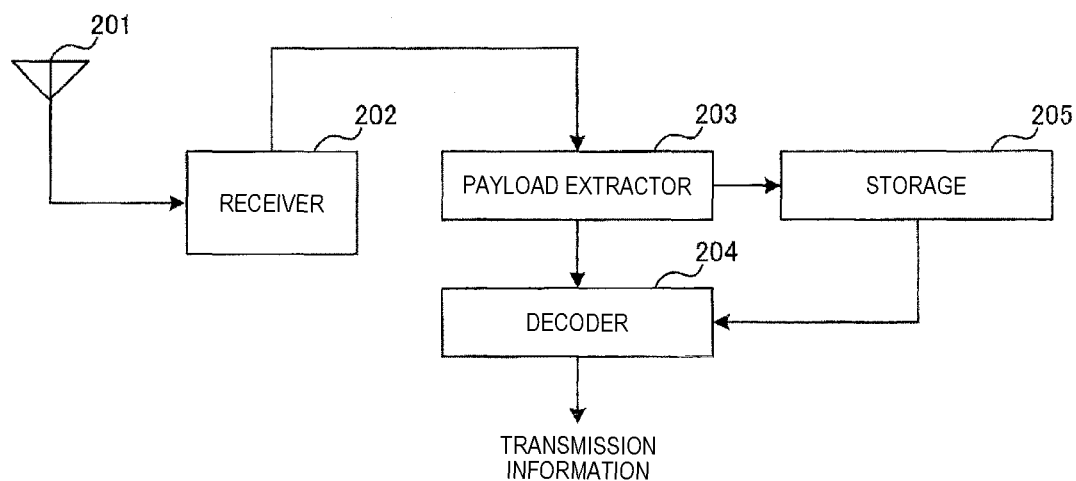
FIG. 4 is a block diagram illustrating a configuration of the reception apparatus according to the first exemplary embodiment.

FIG. 4 is a block diagram illustrating a configuration of reception apparatus 200 according to the present exemplary embodiment. Reception apparatus 200, for example, receives the packet that is transmitted from transmission apparatus 100 according to the communication scheme that uses the LPWA (LoRa or the like).

In FIG. 4, reception apparatus 200 includes antenna 201, receiver 202, payload extractor 203, decoder 204, and storage 205.

Receiver 202 performs reception processing on the packet from transmission apparatus 100, which is received via antenna 201, and outputs the received packet to payload extractor 203.

Payload extractor 203 extracts a payload portion from the received packet that is input from receiver 202. Payload extractor 203 outputs the number-of-packets information that is included in the extracted payload, to storage 205, and outputs the code word symbol to decoder 204.

Decoder 204 decodes the code word symbol that is input from payload extractor 203, and thus acquires decoding data (the transmission information). Specifically, decoder 204 determines a configuration of the code word symbol that is input from payload extractor 203, based on the number K of information word symbols and the number M of parity symbols, which are input from storage 205.

The number K of information word symbols and the number M of parity symbols, which are indicated in the number-of-packets information that is input from payload extractor 203, are retained in storage 205 for output to decoder 204.

Operation of Each of Transmission Apparatus 100 and Reception Apparatus 200

Operation of each of transmission apparatus 100 and reception apparatus 200 that have the above-described configurations is described in detail.

As examples of a parameter necessary for decoding processing in the AL-FEC (for example, the LDPC), there are given (i) at least two of the number (the number K of information word symbols) of valid packets, the number (the number M of parity symbols) of parity packets, and the number (more precisely, (K+M)) of all packets that are used for the transmission of the transmission information, (ii) the order of packets in each of which the code word symbol is transmitted, and (iii) information or the like indicating which of the packets (how many packets are there before the packet that is lost) is lost in a case where the packet loss occurs.

For example, because a parameter that is equivalent to a sequence number is already present in the header information of the packet in the LoRa, the sequence number can be instead used for the above-described parameters (ii) and (iii), and the header information for the AL-FEC does not need to be newly added.

Furthermore, it is estimated that an amount of pieces of data that are included in the transmission information which is transmitted one time in an IoT apparatus is fixed. For this reason, because the number K of information word symbol or the number M of parity symbols is flexibly changed for the above-described parameter (i), the number-of-packets information (the values of K and M) seldom needs to be stored in the header within each packet.

Accordingly, in the present exemplary embodiment, the number-of-packets information (the values of K and M) that is necessary during the decoding processing (for example, decoding for the AL-FEC) in reception apparatus 200 is fixedly used between transmission apparatus 100 and reception apparatus 200. More precisely, among the plurality of packets that include the code word symbols that are based on the transmission information, the number K of packets each of which includes the information word symbol and the number M of packets each of which includes the parity symbol are shared between transmission apparatus 100 and reception apparatus 200.

Figure 5:
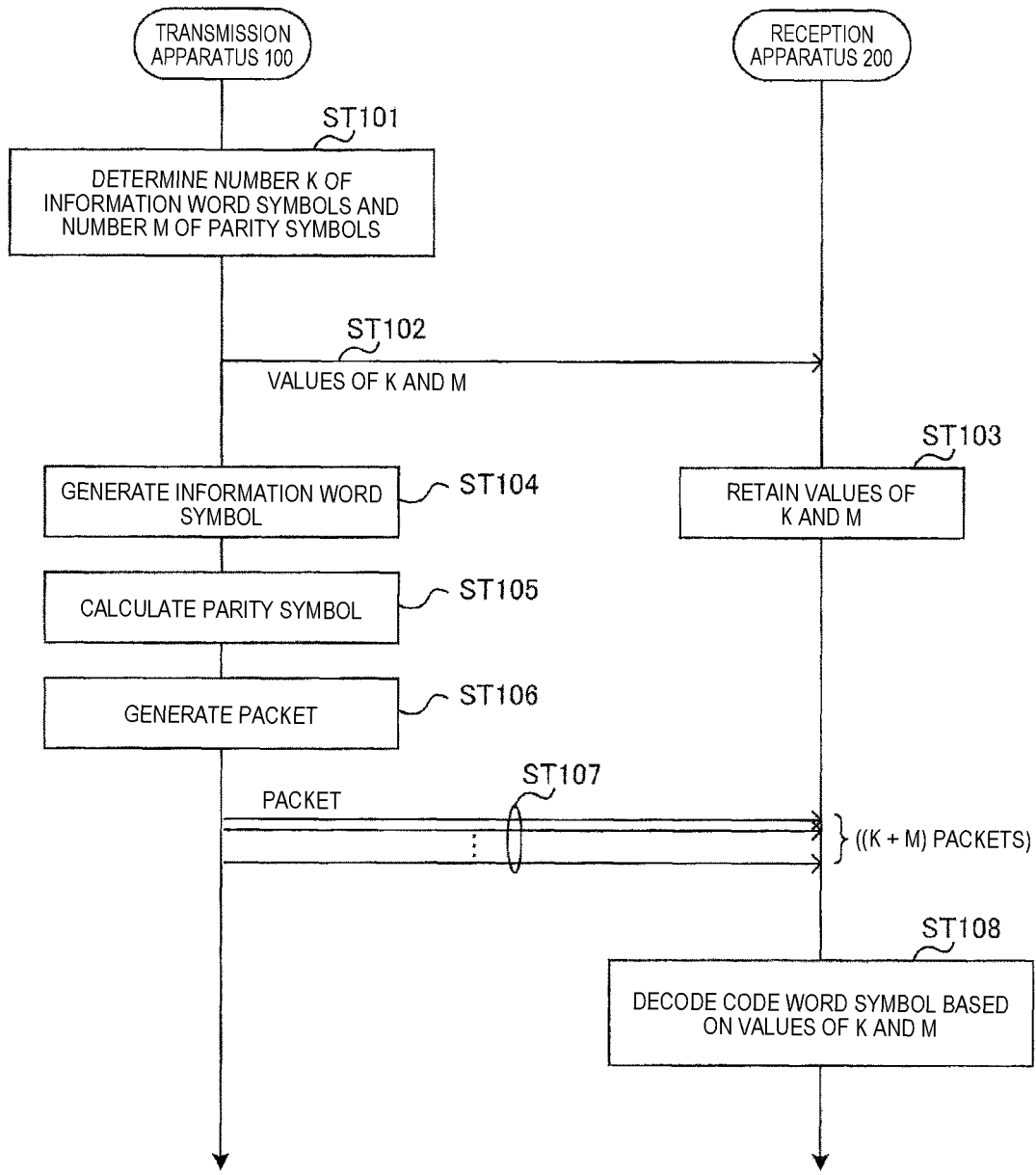
FIG. 5 is a sequence diagram illustrating an example of operation of each of the transmission apparatus and the reception apparatus according to the first exemplary embodiment.
Figure 6:
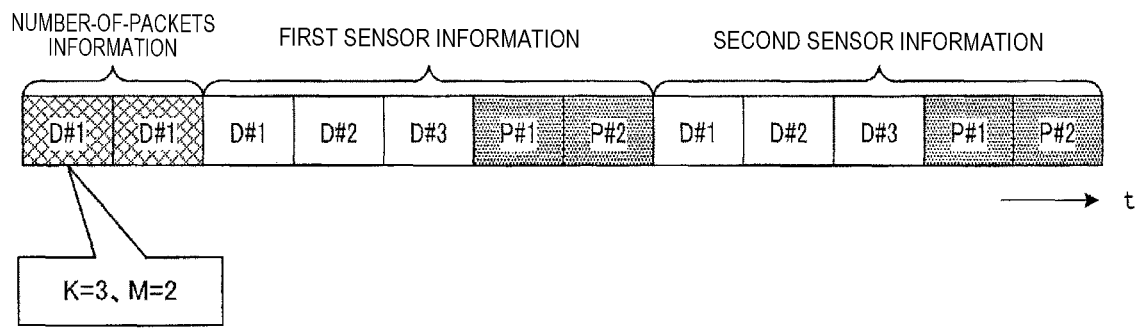
FIG. 6 is a diagram illustrating an example of packet transmission according to the first exemplary embodiment.

FIG. 5 is a sequence diagram illustrating operation of each of transmission apparatus 100 (FIG. 3) and reception apparatus 200 (FIG. 4). Furthermore, FIG. 6 illustrates an example of the packet transmission from transmission apparatus 100 to reception apparatus 200.

Transmission apparatus 100 determines the number K of information word symbols and the number M of parity symbols (ST 101). For example, in FIG. 6, the number K of information word symbols=3 and the number M of parity symbols=2 are determined. More precisely, one piece of transmission information (first or second sensor information) is transmitted in five packets.

Transmission apparatus 100 notifies reception apparatus 200 of the number-of-packets information (K=3 and M=2 in FIG. 6) indicating the number K of information word symbols and the number M of parity symbols, respectively, that are determined in ST 101 (ST 102).

A timing at which the number-of-packets information is notified in ST 102 may be at least a timing earlier than that for the decoding processing (ST 108) of the code word symbol in reception apparatus 200, which will be described below. For example, the number-of-packets information may be notified when communication is established between transmission apparatus 100 and reception apparatus 200.

Furthermore, for the notification of the number-of-packets information, Mac command message that is provided as "proprietary" in LoRaWAN specification V1.1 may be used. The term proprietary is a message command that is uniquely usable or extendable between transmission apparatus 100 (on the network side) and reception apparatus 200.

Furthermore, as long as the values of K and M can be determined in reception apparatus 200, the scheme of sharing the values of K and M between transmission apparatus 100 and reception apparatus 200 is not limited to a case where the values of K and M are notified as the number-of-packets information. For example, the number (=K+M)

of all packets and the number (=K) of information word symbols may be notified as the number-of-packets information.

Furthermore, transmission apparatus 100 may transmit a plurality of packets (two packets in FIG. 6) that includes the number-of-packets information. Accordingly, for example, the probability of the number-of-packets information being not normally received in reception apparatus 200 due to a reception error (a packet loss) can be decreased.

Reception apparatus 200 retains the values of K and M that are determined from the number-of-packets information which is notified by transmission apparatus 100 in ST 102 (ST 103).

Next, transmission apparatus 100 generates the information word symbol based on the transmission information (ST 104), calculates the parity symbol using the information word symbol (ST 105), and generates a plurality of packets that include the code word symbols (the information word symbols and the parity symbols) (ST 106). For example, in FIG. 6, for each of the first sensor information and the second sensor information, transmission apparatus 100 generates three packets, packets D#1 to D#3, each of which includes the information word symbol and two packets, packets P#1 and P#2, each of which includes the parity symbol. Transmission apparatus 100 transmits the packet that is generated in ST 106, to reception apparatus 200 (ST 107).

Based on the values of K and M that are retained in ST 103, reception apparatus 200 decodes the code word symbol that is included in the packet which is received in ST 107 (ST 108). Specifically, among the packets that are received in ST 107 (five packets for each of the first sensor information and the second sensor information in FIG. 6), reception apparatus 200 determines that K packets (three packets in FIG. 6) are for information word symbols and determines that M packets (two packets in FIG. 6) are for parity symbols. Reception apparatus 200 performs the decoding processing using the K information word symbols and the M parity symbols, and thus acquires pieces of transmission information (the first sensor information and the second sensor information).

In this manner, in the present exemplary embodiment, the number K of information word symbols and the number M of parity symbols that are parameters necessary for the decoding processing in the AL-FEC (for example, LDPC) are shared between transmission apparatus 100 and reception apparatus 200 at a timing (for example, at the time of communication establishment) earlier than that for the decoding processing in reception apparatus 200.

Accordingly, transmission apparatus 100 does not need to include the number K of information word symbols and the number M of parity symbols in the header within the packet that is transmitted. More precisely, the number K of information word symbols and the number M of parity symbols (the above-described parameter (i)) can be excluded from the header information that is added to each packet.

Accordingly, in the present exemplary embodiment, the header information within the packet can be suppressed and thus a payload area can be secured. That is, in the present exemplary embodiment, in a case where the restriction in the payload such as in the LPWA is present, the header information dedicated for the AL-FEC can also be suppressed when applying the AL-FEC in the LPWA, and thus the communication that uses the LPWA can be suitably performed.

In the present exemplary embodiment, as an example, a case is described where transmission apparatus 100 sets each of the numbers of information word symbols and parity symbols that constitute the code word symbols and where the number-of-packets information indicating the numbers of symbols that are set are transmitted to reception apparatus 200. However, the number-of-packets information may be shared between transmission apparatus 100 and reception apparatus 200 before the decoding of the code word symbol in reception apparatus 200. For example, the number-of-packets information may be provided in advance in a specification or the like. In this case, setting processing (more precisely, number-of-symbols setter 104 that is illustrated in FIG. 3) and transmission processing of the number-of-packets information in transmission apparatus 100 are unnecessary.

Furthermore, in the present exemplary embodiment, the number-of-packets information may be notified before the decoding of the transmission information that corresponds to the number-of-packets information, and, for example, the post-change number-of-packets information may be notified by transmission apparatus 100 to reception apparatus 200 each time a coding rate (more precisely, the values of K or M) in error correction coding (for example, LDPC coding) of the transmission information is changed. In this case, because the number-of-packets information is not included in the packet in which the transmission information is transmitted, the header information can also be suppressed in the packet.

Second Exemplary Embodiment

In the first exemplary embodiment, a method is described in which the numbers (the number of packets) of information word symbols and parity symbols in the code word symbols are shared between the transmitting and receiving sides and thus the header information in the LPWA is reduced. In contrast, in the present exemplary embodiment, a method is described in which the header information in each packet necessary to notify the numbers of information word symbols and parity symbols in the code word symbols is suppressed to a minimum.

Figure 7:
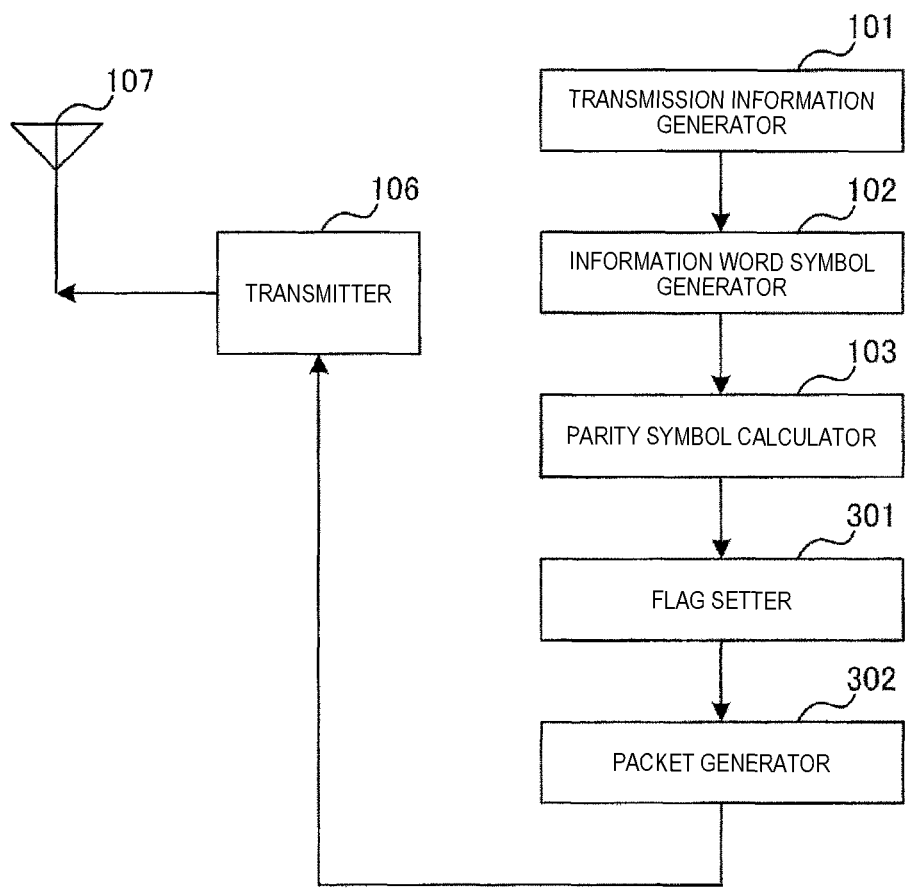
FIG. 7 is a block diagram illustrating a configuration of a transmission apparatus according to a second exemplary embodiment.

FIG. 7 is a block diagram illustrating a configuration of transmission apparatus 300 according to the exemplary embodiment. In FIG. 7, the same constituent element as in the first exemplary embodiment (FIG. 3) is given the same reference numeral, and a description thereof is omitted. Specifically, the second exemplary embodiment is different from the first exemplary embodiment in that number-of-symbols setter 104 is not included in transmission apparatus 300 which is illustrated in FIG. 7 and flag setter 301 is newly added and in that operation of packet generator 302 is different from that of packet generator 105.

In transmission apparatus 300 that is illustrated in FIG. 7, flag setter 301 sets a parity flag indicating whether or not the symbol that constitutes the code word symbol which is input from parity symbol calculator 103 is the parity symbol. For example, flag setter 301 may set the parity flag to be on (for example, parity flag=1) in the case of the parity symbol, and may set the parity flag in the case of the information word symbol to be off (for example, flag=0). Flag setter 301 outputs the code word symbols (the information word symbol and the parity symbol) and the parity flag that is set for each symbol, to the packet generator 302.

The flag that is set in flag setter 301 may be a flag indicating a type of symbol (which of the information word symbol and the parity symbol the symbol is).

Packet generator 302 generates a packet that includes the code word symbol that is input from flag setter 301. On this occasion, regarding each packet, packet generator 302 includes the parity flag that is input from flag setter 301, in the packet to which the symbol corresponding to the parity flag is allocated.

Figure 8:
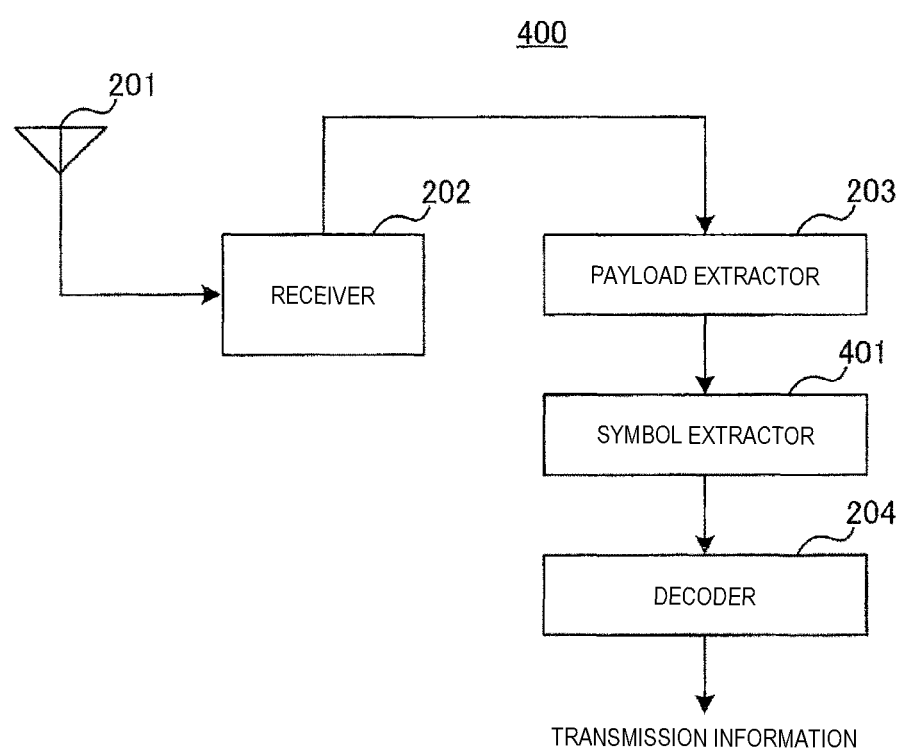
FIG. 8 is a block diagram illustrating a configuration of a reception apparatus according to the second exemplary embodiment.

FIG. 8 is a block diagram illustrating a configuration of reception apparatus 400 according to the present exemplary embodiment. In FIG. 8, the same constituent element as in the first exemplary embodiment (FIG. 4) is given the same reference numeral, and a description thereof is omitted. Specifically, the second exemplary embodiment is different from the first exemplary embodiment in that storage 205 is not included in reception apparatus 400 that is illustrated in FIG. 8 and symbol extractor 401 is newly added.

Based on the parity flag that is included in the received packet, symbol extractor 401 of reception apparatus 400 that is illustrated in FIG. 8 determines whether the symbols that is included in the payload portion of the packet, which is input from payload extractor 203, is the information word symbol or the parity symbol.

Furthermore, based on the transmission interval of the packet that is transmitted from transmission apparatus 300, symbol extractor 401 may determine whether or not the transmission of the transmission information (more precisely, a plurality of packets that include corresponding code word symbols) is completed. For example, in a case where time (more precisely, a non-transmission section) that elapsed after the last packet is received exceeds a threshold, symbol extractor 401 may determine that the transmission of the transmission information is completed. In this case, when a next packet is received, symbol extractor 401 determines that the received next packet is a packet that corresponds to new transmission information.

Operation of Each of Transmission Apparatus 300 and Reception Apparatus 400

Operation of each of the transmission apparatus 300 and reception apparatus 400 that have the above-described configurations is described in detail.

Figure 9:
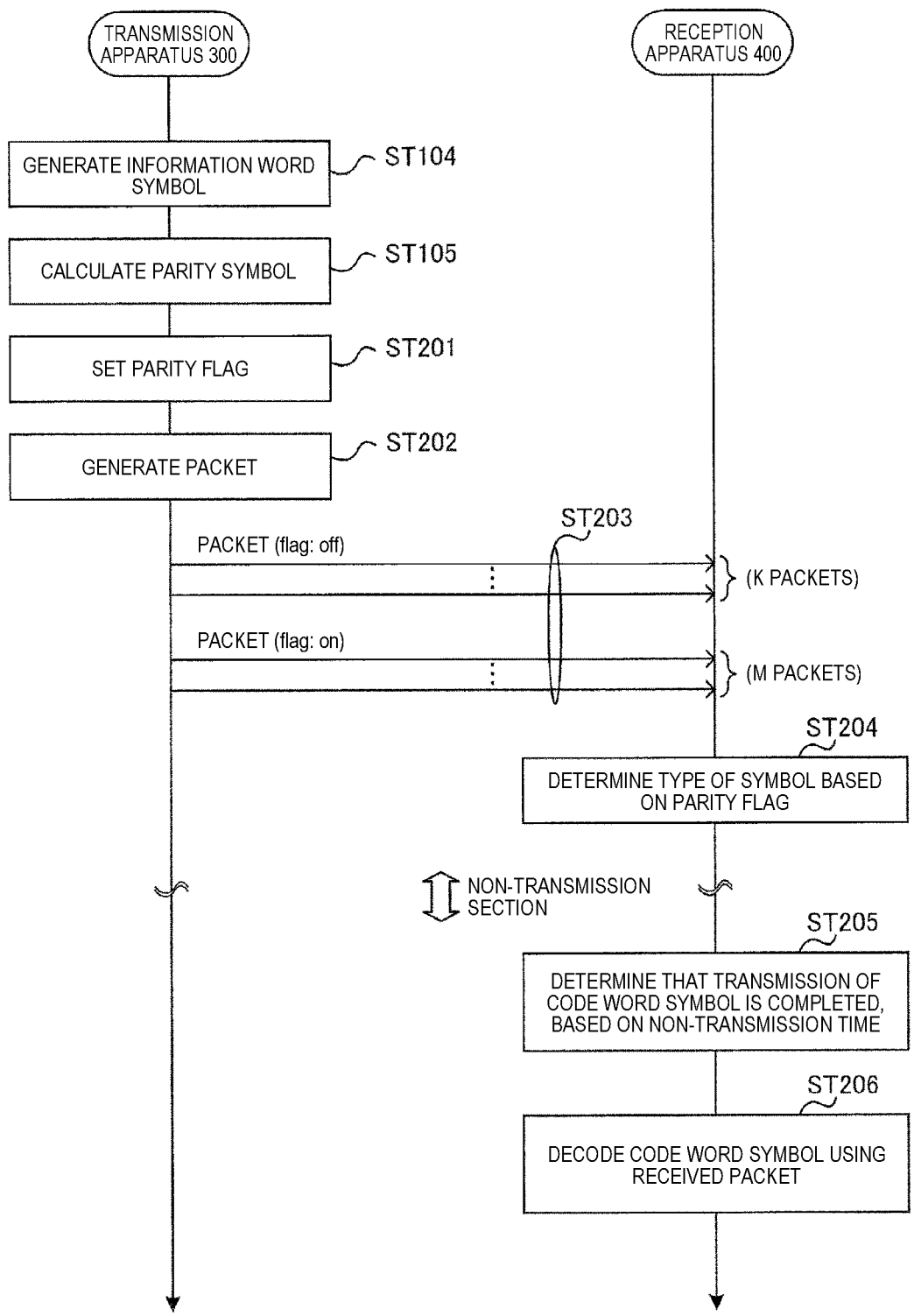
FIG. 9 is a sequence diagram illustrating an example of operation of each of the transmission apparatus and the reception apparatus according to the second exemplary embodiment.

FIG. 9 is a sequence diagram illustrating the operation of each of transmission apparatus 300 (FIG. 7) and reception apparatus 400 (FIG. 8). In FIG. 9, the same operation as in the first exemplary embodiment (FIG. 5) is given the same reference numeral, and a description thereof is omitted.

Figure 10:
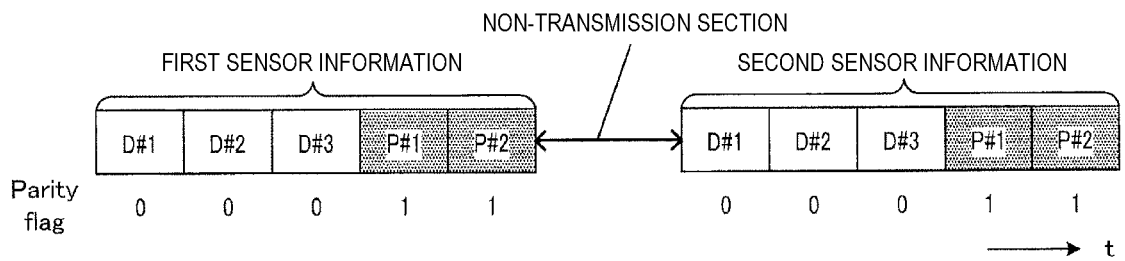
FIG. 10 is a diagram illustrating an example of packet transmission according to the second exemplary embodiment.

Furthermore, FIG. 10 illustrates an example of the packet transmission from transmission apparatus 300 to reception apparatus 400.

In FIG. 9, transmission apparatus 300 sets a flag (here, the parity flag) indicating which of the information word symbol, which is generated in ST 104 and the parity symbol, which is generated in ST 105, the symbol, which is included in each packet that is generated in ST 202 which will be described below, is (ST 201).

For example, as illustrated in FIG. 10, transmission apparatus 300 sets the parity flag to be on (=1) in a case where the symbol that is included in the packet is a parity symbol P, and sets the parity flag to be off (=0) in a case where the symbol that is included in the packet is an information word symbol D.

Transmission apparatus 300 generates a plurality of packets that include the parity flags (one-bit information) and the code word symbols (the information word symbols or the parity symbols) (ST 202).

For example, a field called a Frame Port (or FPort) is included in a MAC payload field (more precisely, a header information field in the LoRa) of a Medium Access Control (MAC) message format for the LoRa. In the Frame Port, values of 0 to 224 are settable and while values of 0 and 224 are reserved, values of 1 to 223 are settable as application-specific values.

Transmission apparatus 300 may include the parity flag (one bit) in the Frame Port field (for example, any of 1 to 223) within the packet. Accordingly, because the parity flag is notified using an existing header information field, a new field does not need to be added as the header information field for the AL-FEC (LDPC), and overhead is not increased.

As illustrated in FIG. 9, transmission apparatus 300 transmits K (K=3 in FIG. 10) packets (parity flag: off) that include the information word symbols and M (M=2 in FIG. 10) packets (parity flag: on) that include parity symbols, to reception apparatus 400 (ST 203).

On the other hand, based on the parity flag that is included in each of the plurality of packets that are received, reception apparatus 400 determines whether the symbol that is included in the packet is the information word symbol or the parity symbol (determines a type of symbol) (ST 204). Specifically, reception apparatus 400 determines that the symbol which is included in the received packet is the information word symbol in a case where the parity flag is off (=0), and determines that the symbol which is included in the received packet is the parity symbol in a case where the parity symbol is on (=1). Reception apparatus 400 performs processing in ST 204 each time a packet is received.

That is, based on the parity flag that is included in each packet, reception apparatus 400 determines the number K of information word symbols and the number M of parity symbols.

Furthermore, based on a non-transmission time (the time that elapsed after the last packet is received) for the packet, reception apparatus 400 determines whether or not the transmission of the transmission information (the code word symbol) is completed (ST 205). For example, in the case where the time (more precisely, the non-transmission section) that elapsed after the last packet is received exceeds the threshold, reception apparatus 400 determines that the transmission of the transmission information is completed.

At this point, the threshold may be set based on a SF value (SF7, SF8, SF9, SF10, or the like) that is set and on an interval at which a sensor performs measurement, in a case where the sensor information is used as an example of the transmission information. For example, as described above, in the LoRa, in a case where the successive transmission time of 400 ms and the transmission interval of 4000 ms are provided, a packet is transmitted every 4.4 sec. On the other hand, it is also assumed that each piece of transmission information (for example, the first and second sensor information that is illustrated in FIG. 10) that is transmitted from transmission apparatus 300 is transmitted at an interval that is sufficiently longer than a packet transmission internal, such as an interval of several tens of minutes or several hours. Consequently, the threshold (the elapsed time for determining that the transmission of the transmission information is completed) may be longer than the transmission interval of the packet and may be set to be within a range of time that is shorter than the transmission interval of the transmission information.

Reception apparatus 400 decodes the code word symbols (K information word symbols and M parity symbols in FIG. 9) that are included in the packets which are received until it is determined that the transmission of the transmission information is completed (ST 206). Accordingly, reception apparatus 400 acquires the transmission information (for example, the sensor information).

In this manner, in the present exemplary embodiment, transmission apparatus 300 notifies reception apparatus 400 of the flag (one-bit information, 0 or 1) indicating whether the code word symbol that is included in each packet is the information word symbol or the parity symbol, as the header information. Then, based on the flag, reception apparatus 400 determines the number K of information word symbols and the number M of parity symbols.

Accordingly, according to the present exemplary embodiment, an increase in the size of the header information within the packet is suppressed to a minimum (one bit), and thus it is possible that a length of the code word symbol is set in a changeable manner on a per-transmission information basis while the payload is secured. Consequently, in the present exemplary embodiment, even in a case where a transfer rate is changeable according to radio quality, for example, such as in case where an Adaptive Data Rate (ADR) for the LoRa is used, transmission apparatus 300 and reception apparatus 400 can also suitably perform packet communication in the LoRa.

Furthermore, according to the present exemplary embodiment, based on the flag (the parity flag), reception apparatus 400 determines the number of information word symbols and the number of parity symbols. Because of this, for example, the information (for example, the number-of-packets information) for notifying the number of symbols does not need to be notified during negotiation at the time of the communication establishment.

Furthermore, according to the present exemplary embodiment, in a case where the packet non-transmission section exceeds the threshold, reception apparatus 400 determines that the transmission of the transmission information (the code word symbols) is completed. Accordingly, reception apparatus 400 can determine the completion of the transmission of the code word symbols (the transmission information) without waiting for a next valid packet (more precisely, a packet that includes the parity flag: off) to be received.

In the present exemplary embodiment, reception apparatus 400 may determine the completion of the transmission of the transmission information based on any other method, without being limited to a case where, by processing in ST 205, it is determined that the transmission of the transmission information is completed. For example, according to information (information indicating the completion of the transmission of the transmission information explicitly or implicitly, which includes the above-described parity flag) that is included in the packet which is notified by transmission apparatus 300, reception apparatus 400 may determine that the transmission of the transmission information is completed.

Third Exemplary Embodiment

In the second exemplary embodiment, a case is described where the reception apparatus determines the number of information word symbols and the number of parity symbols based on the parity flag. However, in the case where the packet loss occurs in the vicinity of the border between the packet that includes the information word symbol and the packet that includes the parity symbol, a situation is present where the reception apparatus cannot determine whether the symbol that is included in the lost packet is the information word symbol or the parity symbol.

Figure 11A:
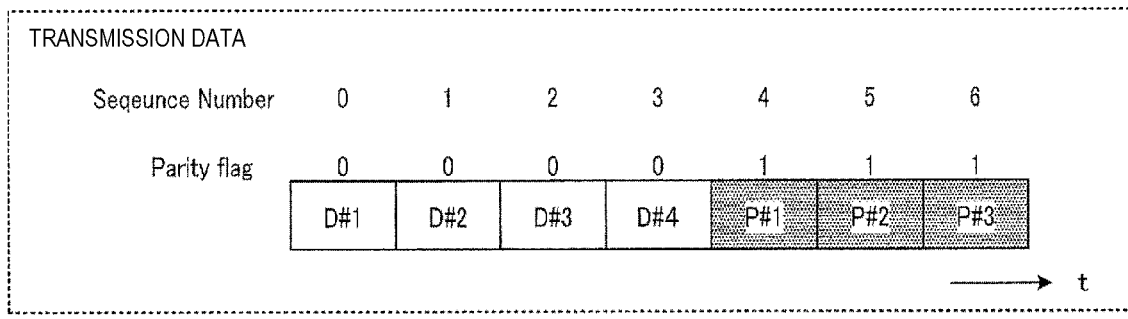
FIG. 11A is a diagram for describing a solution according to a third exemplary embodiment.
Figure 11B:
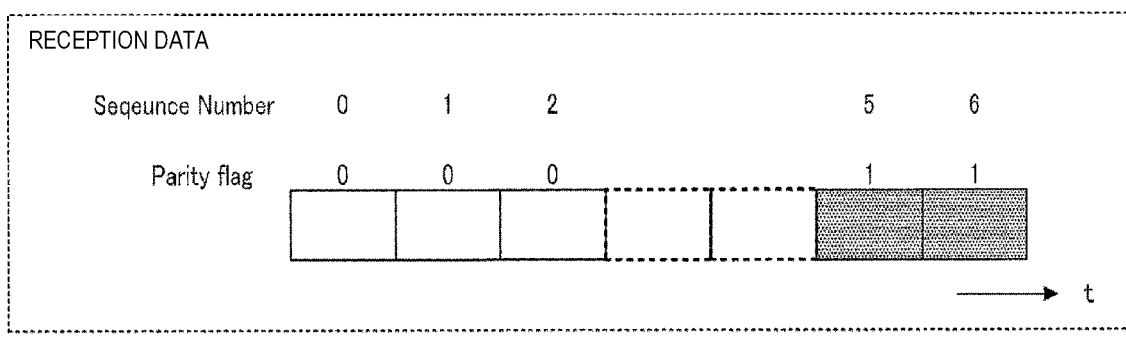
FIG. 11B is a diagram for describing the solution according to the third exemplary embodiment.

As an example, FIG. 11A illustrates a transmission data and FIG. 11B illustrates a reception data in the case where the packet loss occurs.

In FIG. 11A, the transmission apparatus transmits four packets, packets D#1 to D#4 (sequence numbers 0 to 3) that include the information word symbols and three packets, packets P#1 to P#3 (packet numbers 4 to 6) that include the parity symbols. Furthermore, in FIG. 11B, the reception apparatus receives three valid packets (parity flag=0) that have sequence numbers 0 to 2, respectively, and two parity packets (parity flag-=1) that have sequence numbers 5 and 6. That is, in FIG. 11B, the reception apparatus fails to receive packets that have sequence numbers 3 and 4, respectively.

Figure 11C:
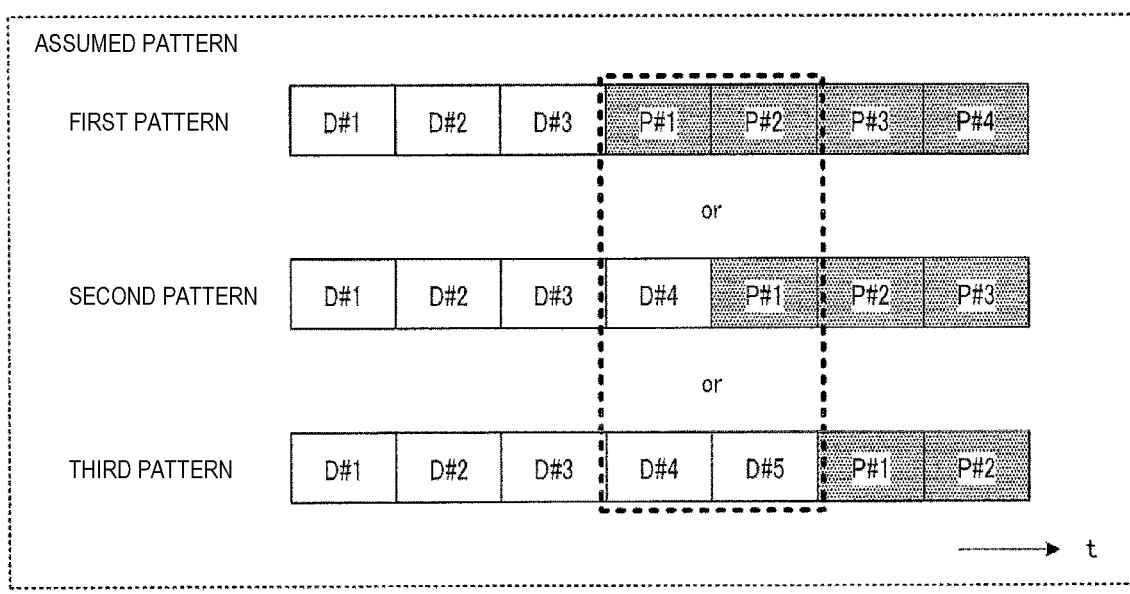
FIG. 11C is a diagram for describing the solution according to the third exemplary embodiment.

In the case of FIG. 11B, the reception apparatus can correct the lost packets (symbols) that have the sequence numbers 3 and 4, using the parity symbols that correspond to the packets that have the sequence numbers 5 and 6, which are normally received. At this point, as illustrated in FIG. 11C, regarding the packets that have the sequence numbers 3 and 4, respectively, a case (a first pattern) where both of the packets include the parity symbols, a case (a second pattern) where the packets have the information word symbol and the parity symbol, respectively, and a case (a third pattern) where both of the packets include the information word symbols are assumed. However, on the receiving side, it cannot be determined which of the patterns the symbols that are included in the corrected packets that have the sequence numbers 3 and 4, respectively, are equivalent to.

Accordingly, in the present exemplary embodiment, a method is described in which, even in a case where the packet loss occurs, the code word symbol can also be suitably decoded in the reception apparatus.

Figure 12:
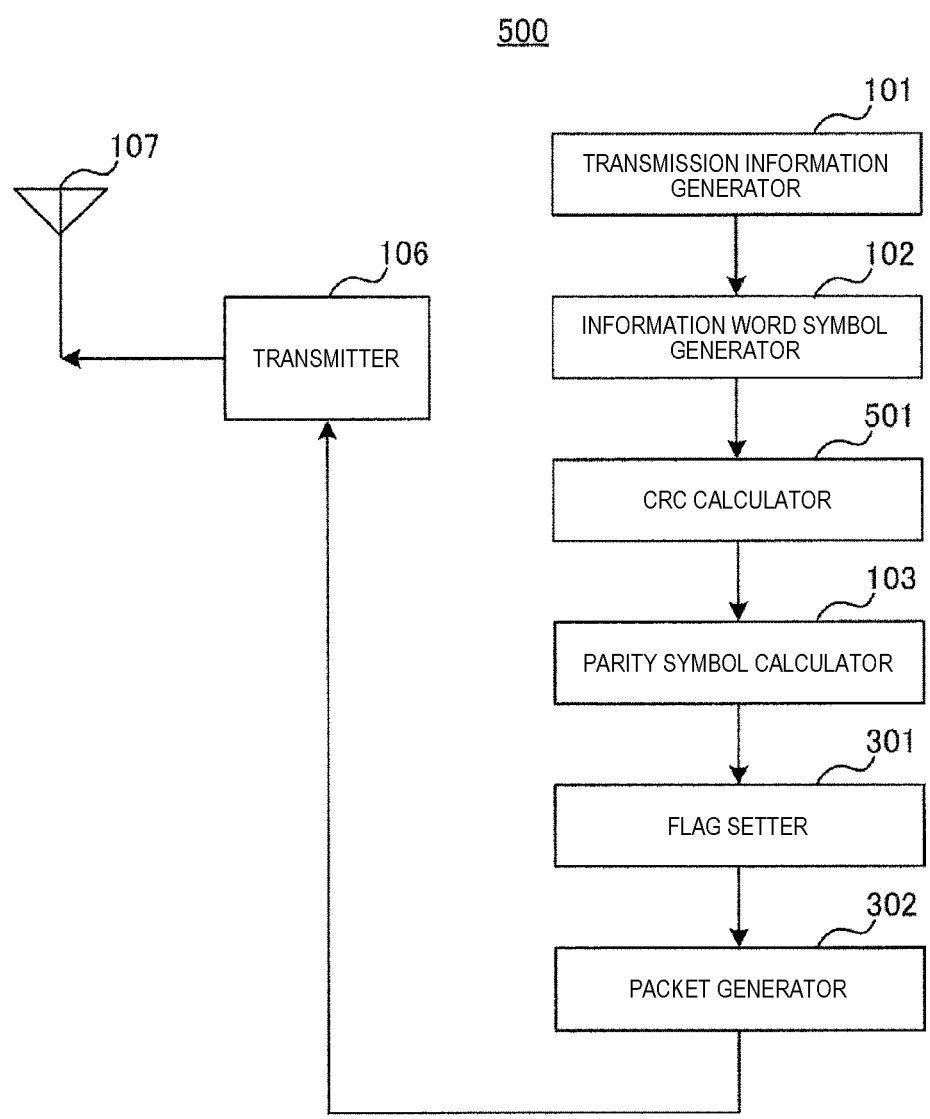
FIG. 12 is a block diagram illustrating a configuration of a transmission apparatus according to the third exemplary embodiment.

FIG. 12 is a block diagram indicating a configuration of transmission apparatus 500 according to the present exemplary embodiment. In FIG. 12, the same constituent element as in the second exemplary embodiment (FIG. 7) is given the same reference numeral, and a description thereof is omitted. Specifically, the third exemplary embodiment is different from the second exemplary embodiment in that cyclic redundancy check (CRC) calculator 501 is newly added to transmission apparatus 500 that is illustrated in FIG. 12.

In transmission apparatus 500 that is illustrated in FIG. 12, CRC calculator 501 calculates a CRC code (an error detection code) using the information word symbol that is input from information word symbol generator 102. CRC calculator 501 outputs the information word symbol, and the calculated CRC code to parity symbol calculator 103.

In parity symbol calculator 103, the parity symbol is calculated with the CRC code calculated in CRC calculator 501 also serving as one piece of information word symbol. Among a plurality of packets that include code word symbols, packet generator 302 includes the CRC code in the rearmost packet, among the packets that include the information word symbols. More precisely, the CRC code is included at a packet at a border between the packet that includes the information word symbol and the packet that includes the parity symbol.

Figure 13:
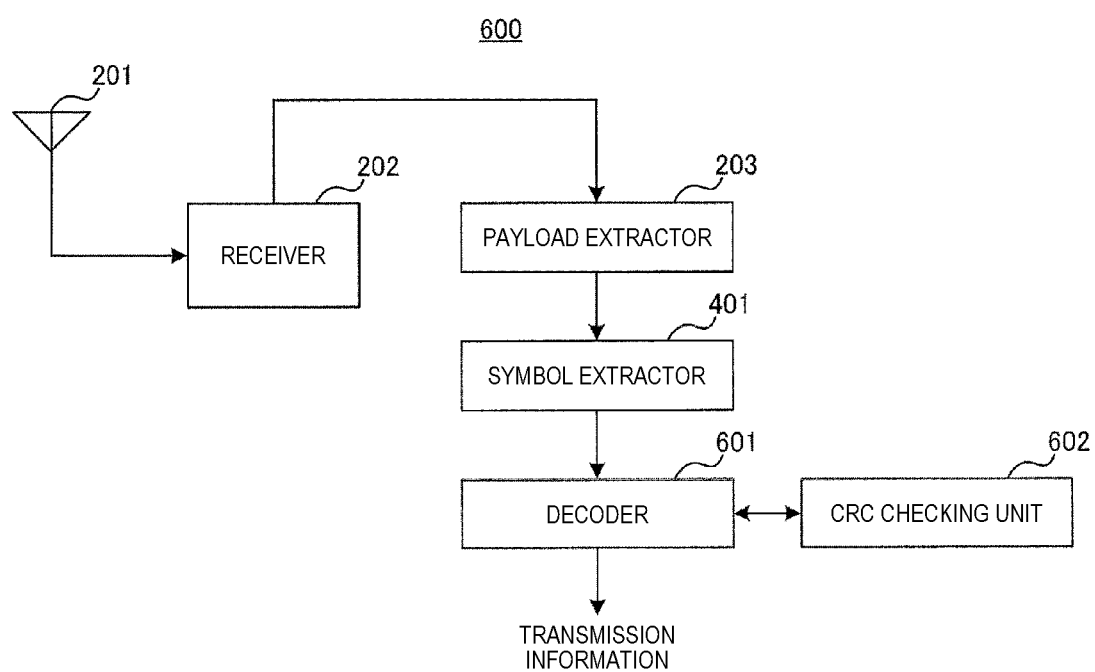
FIG. 13 is a block diagram illustrating a configuration of a reception apparatus according to the third exemplary embodiment.

FIG. 13 is a block diagram illustrating a configuration of reception apparatus 600 according to the present exemplary embodiment. In FIG. 13, the same constituent element as in the second exemplary embodiment (FIG. 8) is given the same reference numeral, and a description thereof is omitted. Specifically, the third exemplary embodiment is different from the first exemplary embodiment in that a CRC checking unit 602 is newly added to the reception apparatus 600 that is illustrated in FIG. 13 and in that operation of decoder 601 is different from that of decoder 204 in the first exemplary embodiment.

In reception apparatus 600 that is illustrated in FIG. 13, decoder 601 decodes the code word symbol that is input from symbol extractor 401. On this occasion, in a case where the packet whose loss occurs is present, decoder 601 decodes the code word symbol that assumes any of the combinations (patterns) that can be made in such a manner as to include the symbol (the information word symbol or the parity symbol) that is included in the lost packet. Decoder 601 outputs a result of the decoding to CRC checking unit 602. Furthermore, in a case where a result of CRC determination, which is input from CRC checking unit 602 is error-free (CRC: OK), decoder 601 outputs a result (the transmission information) of the decoding. On the other hand, in a case where the result of the CRC determination, which is input from CRC checking unit 602, is in error (CRC: NG), decoder 601 decodes the code word symbol that assumes any other pattern. Decoder 601, for example, repeats the above-described processing until the result of the CRC determination is in error (CRC: NG).

CRC checking unit 602 performs the CRC determination (error detection) on the result of the decoding, which is input from decoder 601, and outputs the result (being error-free (CRC: OK) or being in error (CRC: NG)) of the CRC determination to decoder 601.

In this manner, reception apparatus 600 performs the decoding (AL-FEC decoding) and determines a correct pattern with CRC (the error detection code) checking on the assumption of both a case where, in the lost packet, the parity flag is off (=0) and a case where, in the lost packet, the parity flag is on (=1) in a case where the packet loss occurs.

Operation of Each of Transmission Apparatus 500 and Reception Apparatus 600

Operation of each of transmission apparatus 500 and reception apparatus 600 that have the above-described configurations is described in detail.

Figure 14:
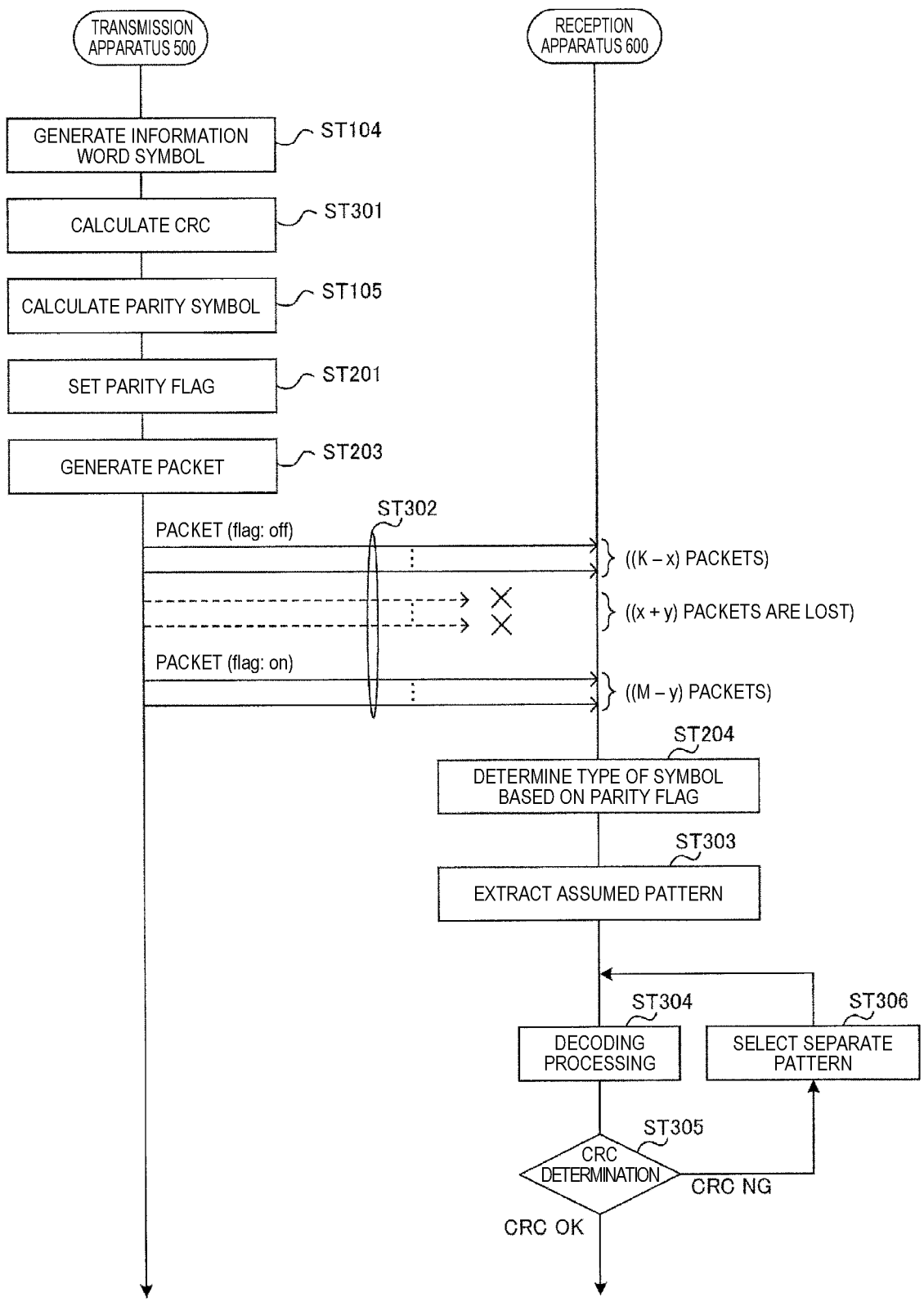
FIG. 14 is a sequence diagram illustrating an example of operation of each of the transmission apparatus and the reception apparatus according to the third exemplary embodiment.

FIG. 14 is a sequence diagram illustrating the operation of each of transmission apparatus 500 (FIG. 12) and reception apparatus 600 (FIG. 13). In FIG. 14, the same operation as in the second exemplary embodiment (FIG. 9) is given the same reference numeral, and a description thereof is omitted.

Figure 15A:
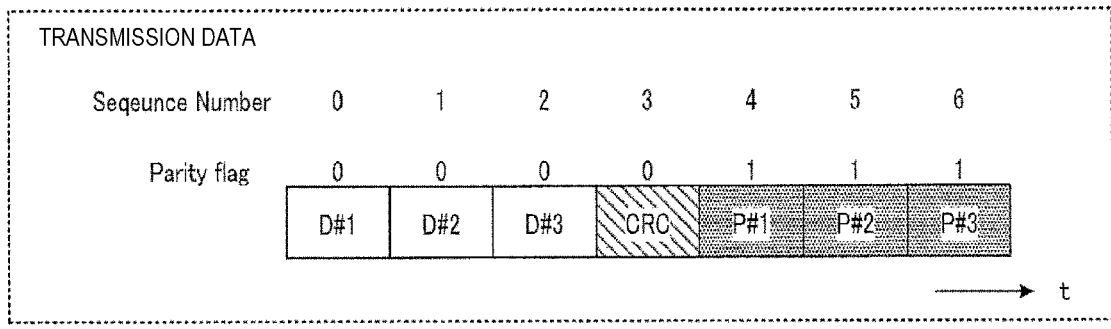
FIG. 15A is a diagram illustrating an example of transmission data according to the third exemplary embodiment.
Figure 15B:
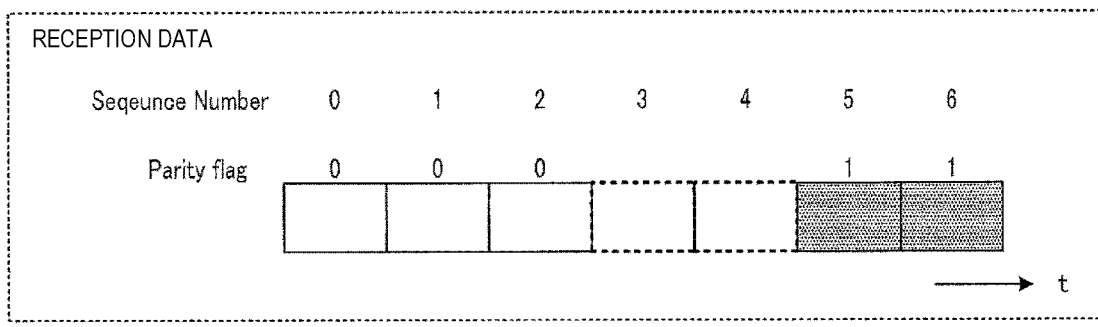
FIG. 15B is a diagram illustrating an example of reception data according to the third exemplary embodiment.
Figure 15C:
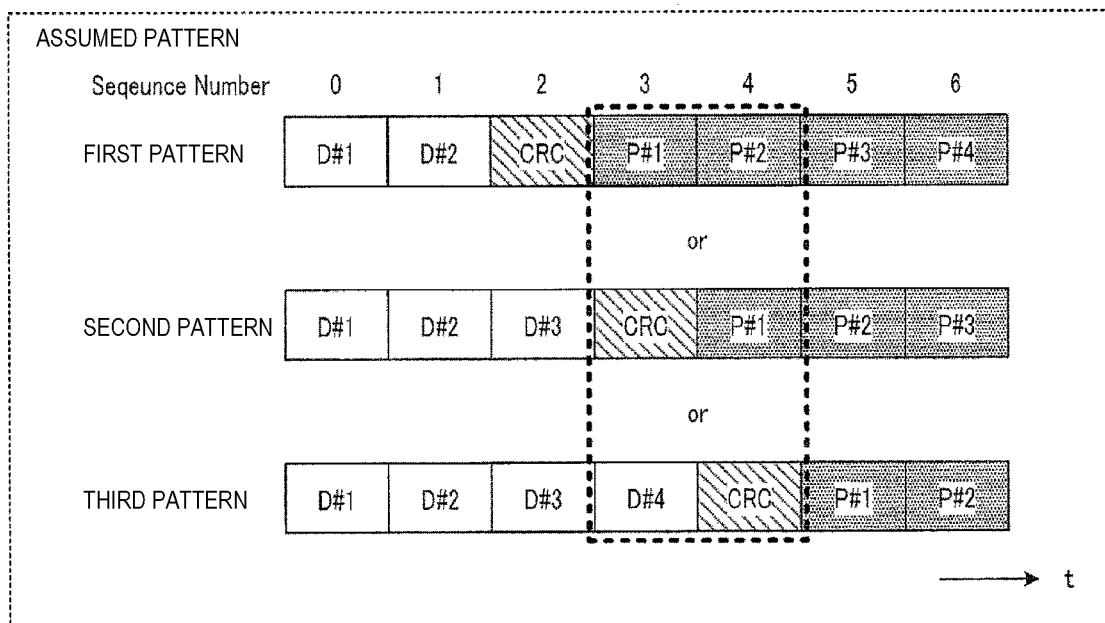
FIG. 15C is a diagram illustrating a pattern that is assumed according to the third exemplary embodiment.

Furthermore, FIG. 15A illustrates an example of the transmission data (the packet) that is transmitted from transmission apparatus 500. FIG. 15B illustrates an example of the reception data (the packet) that is received in reception apparatus 600. FIG. 15C illustrates an example of combinations (patterns) of the information word symbols (which include the CRC code) and the parity symbols, which constitutes the code word symbols that are assumed in the case where the packet loss occurs in reception apparatus 600.

In FIG. 14, transmission apparatus 500 calculates the CRC code using the information word symbol that is generated in ST 104 (ST 301).

Transmission apparatus 500 calculates the parity symbol using the information word symbol that is generated in ST 104 and the CRC code that is calculated in ST 301 (ST 105).

For example, in FIG. 15A, transmission apparatus 500 calculates the CRC code using information word symbols D#1 to D#3, and calculates parity symbols P#1 to P#3 using information word symbols D#1 to D#3 and the CRC code. That is, in FIG. 15A, the number K of information word symbols=4 and the number M of parity symbols=3.

The code word symbols ((K+M) packets) that are generated in transmission apparatus 500 are transmitted to reception apparatus 600 (ST 302).

On this occasion, for example, it is assumed that in reception apparatus 600, packet loss of packets that include x (x=0 to K) information word symbols and packet loss of packets that include y (y=0 to M) parity symbols occurs. That is, reception apparatus 600 receives (K−x) information word symbols (packets) and (M−y) parity symbols (packets). For example, in FIG. 15B, one packet (more precisely, x=1 and a CRC code that has a sequence number 3) is lost among packets that include four information word symbols, and one packet (more precisely, y=1 and P#1 that has a sequence number 4) is lost among packets that include three parity symbols.

In the same manner as in the second exemplary embodiment, reception apparatus 600 determines a type of symbol based on the parity flag that is included in each packet (ST 204). In the case of FIG. 15B, reception apparatus 600 determines that the sequence numbers 0 to 2 are information word symbols (parity flag=0) and that the sequence numbers 5 and 6 are parity symbols (parity flag=1). More precisely, in FIG. 15B, as a result of symbol extraction, reception apparatus 600 determines that packet loss of packets that have the sequence numbers 3 and 4, respectively, has occurred.

Accordingly, reception apparatus 600 extracts all patterns that are assumed as symbols that are included in the lost packet (ST 303). For example, as illustrated in FIG. 15B, in a case where the packets that have the sequence numbers 3 and 4, respectively, are lost, reception apparatus 600 extracts patterns 1 to 3 in FIG. 15C. Specifically, as illustrated in FIG. 15C, regarding the packets that have the sequence numbers 3 and 4, respectively, the case (the first pattern) where both of the packets include parity symbols P#1 and P#2, the case (the second pattern) where the packets have the information word symbol (the CRC code) and the parity symbol P#1, respectively, and the case (the third pattern) where both of the packets include the information word symbols (D#4 and the CRC code) are assumed.

Reception apparatus 600 performs the decoding processing on the code word symbol that assumes any one pattern of the patterns that are extracted in ST 303 (ST 304). In FIG. 15B, because two parity symbols (the sequence numbers 5 and 6) are received, in the decoding processing in ST 304, reception apparatus 600 can correct two lost packets (the sequence numbers 3 and 4) using the two parity symbols, and can obtain the information word symbol (which include the CRC code).

Next, reception apparatus 600 performs the CRC determination (the error detection) on the result of the decoding in ST 304 (ST 305). In a case where the result of the CRC determination is OK (in a case where the result of the CRC determination is error-free), reception apparatus 600 outputs the result of decoding as the transmission information. On the other hand, in a case where the result of the CRC determination is NG (in a case where the CRC determination is in error), reception apparatus 600 selects a separate pattern on which the decoding processing is not performed (ST 306), and again performs the decoding processing in ST 304 on the assumption of the selected pattern.

As an example, a case is described where reception apparatus 600 performs the CRC determination on the first to third patterns that are illustrated in FIG. 15C.

In a case where the first pattern that is illustrated in FIG. 15C is assumed, reception apparatus 600 performs the CRC determination on information word symbols D#1 and D#2 using the packet (actually, information word symbol D#3 as illustrated in FIG. 15A) that has the sequence number 2, as the CRC code. As a result, reception apparatus 600 determines that the result of the CRC determination is in error.

On the other hand, in a case where the second pattern (which has the same configuration as the transmission data in FIG. 15A) that is illustrated in FIG. 15C is assumed, reception apparatus 600 decodes the packet (the CRC code) that has the sequence number 3, using the parity symbols P#2 and P#3 that have the sequence numbers 5 and 6, respectively, and performs the CRC determination on the information word symbols D#1 to D#3 using the CRC code that is obtained by the decoding. As a result, reception apparatus 600 determines that the result of the CRC determination is error-free.

Furthermore, in a case where the third pattern that is illustrated in FIG. 15C is assumed, reception apparatus 600 decodes the packets (the information word symbol D#4 and a CRC packet and actually, the CRC code and the parity symbol P#1 that are illustrated in FIG. 15A) that have the sequence numbers 3 and 4, respectively, using the parity symbols P#1 and P#2 that have the sequence numbers 5 and 6, respectively, and performs the CRC determination on the information word symbols D#1 to D#4 using the CRC code that is obtained by the decoding. As a result, reception apparatus 600 determines that the result of the CRC determination is in error.

In this manner, in the present exemplary embodiment, transmission apparatus 500 adds the CRC code to a packet (the rearmost information word symbol among the information word symbols) at a border between the information word symbol and the parity symbol in the code word symbols. In a case where the packet loss occurs and where the border between the information word symbol and the parity symbol cannot be determined based on the parity flag, reception apparatus 600 detects an error-free pattern using the CRC code.

More precisely, in the present exemplary embodiment, as illustrated in FIG. 15A, transmission apparatus 500 calculates the parity symbol using the CRC code as one portion of the information word symbol. Accordingly, in a case where the packet that includes the CRC code is lost, reception apparatus 600 can also correct the CRC code by the AL-FEC decoding, using the parity symbol that is normally received. Reception apparatus 600 can perform the error detection of any one information word symbol using the obtained CRC code.

Accordingly, according to the present exemplary embodiment, in the case where the packet loss occurs, reception apparatus 600 can also correctly determine the border between the information word symbol and the parity symbol, and can also suitably receive the transmission information.

With reference to FIG. 15A, a case is described where the CRC code is transmitted as a new packet (the CRC packet), but no limitation to this is imposed. At least the CRC code may be included in the packet at the border between the packet that includes the information word symbol and the packet that includes the parity symbol. For example, transmission apparatus 500 may transmit the CRC code using one portion (for example, a padding area) of the packet in which the information word symbol is transmitted. Accordingly, an amount (the number of packets) of information of the code word symbols can be reduced.

Furthermore, in the present exemplary embodiment, a case is described where the CRC is used, but no limitation to the CRC is imposed. The code, an error in which is detectable, may be used.

The exemplary embodiments of the present disclosure are described above.

The above-described exemplary embodiments are based on the LoRa, which is an example of LPWA that uses the unlicensed band. However, a communication scheme to which the present disclosure is applicable is not limited to LoRa, it may be based on any other LPWA standard, and it may be applied to any other notification scheme that is small in payload size per a packet, as is the case with LoRa.

It is possible that the present disclosure is realized in software, hardware, or software that operates in conjunction with hardware. Each functional blocks that is used for the description of the above-described exemplary embodiments may be realized, in part and wholly, as a large-scale integration (LSI), and each processor that is described in the above-described exemplary embodiments may be controlled, in part and wholly, by one LSI circuit or a combination of LSI circuits. The LSI circuit may be configured with an individual chip, and may be configured with one chip in such a manner as to include one or several portions, or all portions, of the functional block. The LSI circuit may have a data input and a data output. In some cases, the LSI circuit is referred to as an integrated circuit (IC), a system LSI circuit, a super-LSI circuit, and an ultra-LSI circuit, depending on a difference in the degree of integration. A technique for circuit integration is not limited to the LSI circuit, and may be achieved by a dedicated circuit, a general-purpose processor or a dedicated processor. Furthermore, after fabrication of the LSI circuit, a field programmable gate array (FPGA) in which programming is possible, or a reconfigurable processor in which reconfiguration of connections and settings of circuit cells within the LSI circuit is possible may be used. The present disclosure may be realized with digital processing or analog processing. If a circuit integration technology that finds application in the LSI circuit appears with the advancement in semiconductor technology or with other technologies derived from the technology, of course, the functional blocks may be integrated using such a technology. There can be a likelihood of application of a biotechnology or the like.

A reception apparatus according to an aspect of the present disclosure includes a receiver and a circuitry. The receiver receives, from a transmission apparatus, a plurality of packets that include code word symbols which include an information word symbol and a parity symbol. The information word symbol is generated from transmission information. The parity symbol is calculated from the information word symbols. The circuitry decodes the code word symbols that are included in the plurality of packets. The number of first packets and the number of second packets among the plurality of packets are shared between the transmission apparatus and the reception apparatus. Each of the first packets includes the information word symbol. Each of the second packets includes the parity symbol.

In the reception apparatus according to the aspect of the present disclosure, the receiver may receive information indicating the numbers of first packets and second packets at least before the code word symbol is decoded.

In the reception apparatus according to the aspect of the present disclosure, the numbers of first packets and second packets among the plurality of packets may be provided in advance.

A reception apparatus according to another aspect of the present disclosure includes a receiver and circuitry. The receiver receives, from a transmission apparatus, a plurality of packets that include code word symbols that include an information word symbol and a parity symbol. The information word symbol is generated from transmission information. The parity symbol is calculated from the information word symbol. The circuitry decodes the code word symbols that are included in the plurality of packets. Each of the plurality of packets includes a flag that indicates which of the information word symbol and the parity symbol a symbol that is included in the packet is.

In the reception apparatus according to the aspect of the present disclosure, in a case where the time that elapsed after a last packet among the plurality of packets is received exceeds a threshold, the circuitry may determine that transmission of the transmission information is completed.

In the reception apparatus according to the aspect of the present disclosure, among the plurality of packets, an error detection code for the information word symbol is included in a packet at a border between first packets that include the information word symbol and a second packet that includes the parity symbol. The circuitry may perform error detection on a result of decoding of the information word symbol, using the error detection code.

In the reception apparatus according to the aspect of the present disclosure, at least the error detection code may be included in a rearmost packet among the first packets.

In the reception apparatus according to the aspect of the present disclosure, the parity symbol may be calculated from the information word symbol and the error detection code.

In the reception apparatus according to the aspect of the present disclosure, the circuitry may perform the error detection on a lost packet in the reception apparatus, assuming that the lost packet is one of the first packets and that the lost packet is the second packet.

A transmission apparatus according to still another aspect of the present disclosure includes circuitry and a transmitter. The circuitry generates a plurality of packets that include code word symbols that include an information word symbol and a parity symbol. The information word symbol is generated from transmission information. The parity symbol is calculated from the information word symbol. The transmitter transmits the plurality of packets to a reception apparatus. The number of first packets and the number of second packets among the plurality of packets are shared between the transmission apparatus and the reception apparatus. Each of the first packets includes the information word symbol. Each of the second packets includes the parity symbol.

A transmission apparatus according to still another aspect of the present disclosure includes circuitry and a transmitter. The circuitry generates a plurality of packets that include code word symbols that include an information word symbol and a parity symbol. The information word symbol is generated from transmission information. The parity symbol is calculated from the information word symbol. The circuitry sets a flag that indicates which of the information word symbol and the parity symbol a symbol that is included in each of the plurality of packets is. The transmitter transmits the plurality of packets each of which includes the flag, to a reception apparatus.

A reception method according to still another aspect of the present disclosure includes receiving and decoding. In the receiving, a plurality of packets that include code word symbols that include an information word symbol and a parity symbol are received from a transmission apparatus. The information word symbol is generated from transmission information. The parity symbol is calculated from the information word symbol. In the decoding, the code word symbols that are included in the plurality of packets are decoded. The number of first packets and the number of second packets among the plurality of packets are shared between the transmission apparatus and a reception apparatus. Each of the first packets includes the information word symbol. Each of the second packets includes the parity symbol.

A reception method according to still another aspect of the present disclosure includes receiving and decoding. In the receiving, a plurality of packets that include code word symbols that include an information word symbol and a parity symbol are received from a transmission apparatus. The information word symbol is generated from transmission information. The parity symbol is calculated from the information word symbol. In the decoding, the code word symbols that are included in the plurality of packets are decoded. Each of the plurality of packets includes a flag that indicates which of the information word symbol and the parity symbol a symbol that is included in the packet is.

A transmission method according to still another aspect of the present disclosure includes generating and transmitting. In the generating, a plurality of packets that include code word symbols that include an information word symbol and a parity symbol are generated. The information word symbol is generated from transmission information. The parity symbol is calculated from the information word symbol. In the transmitting, the plurality of packets are transmitted to a reception apparatus. The number of first packets and the number of second packets among the plurality of packets are shared between a transmission apparatus and the reception apparatus. Each of the first packets includes the information word symbol. Each of the second packets includes the parity symbol.

A transmission method according to still another aspect of the present disclosure includes generating, setting, and transmitting. In the generating, a plurality of packets that include code word symbols that include an information word symbol and a parity symbol are generated. The information word symbol is generated from transmission information. The parity symbol is calculated from the information word symbol. In the setting, a flag is set. The flag indicates which of the information word symbol and the parity symbol a symbol that is included in each of the plurality of packets is. In the transmitting, the plurality of packets each of which includes the flag are transmitted to a reception apparatus.

According to an aspect of the present disclosure, the usefulness to a mobile communication system is provided.

What is claimed is:

1. A system comprising:
  a transmission apparatus comprising:
    a transmitter, which, in operation, transmits, over a network, a plurality of packets that include:
      first packets that include information word symbols generated from transmission information;
      second packets that include parity symbols generated from the information word symbols; and
      a third packet including an error detection code for the information word symbols, the third packet being included at a border between the first packets and the second packets, and the plurality of packets including a respective plurality of flags indicating whether a symbol included in a packet is an information word symbol or a parity symbol; and
  a reception apparatus comprising:
    a receiver, which, in operation, receives the plurality of packets over the network; and
    circuitry, which, in operation, in response to determining that one or more packets are lost,
  determines a number of the first packets and a number of the second packets based on the plurality of flags;
  based on the numbers of the first packets and the second packets, determines a plurality of permutations of the plurality of packets and the one or more packets in which positions of the one or mare packets in relation to positions of the plurality of packets are varied; and
  evaluates a permutation of the plurality of permutations to decode the information word symbols included in the plurality of packets,
  wherein the error detection code is based on a different error detection scheme than the parity symbols.

2. The system of claim 1, wherein, in a case where time that elapsed after a last packet among the plurality of packets is received exceeds a threshold, the circuitry determines that transmission of the transmission information is completed.

3. The system of claim 1, wherein the circuitry performs error detection on a result of decoding of the information word symbols, using the error detection code.

4. The system of claim 3, wherein at least the error detection code is included in a rearmost packet among the first packets.

5. The system of claim 3, wherein the parity symbols are calculated from the information word symbols and the error detection code.

6. The system of claim 3, wherein the one or more packets are an information word symbol packet or a parity packet.

7. A method comprising:
  transmitting, by a transmission apparatus, a plurality of packets over a network, the plurality of packets including:
    first packet that include information word symbols generated from transmission information;
    second packets that include parity symbols generated from the information word symbols; and
    a third packet including an error detection code for the information word symbols, the third packet being included at a border between the first packets and the second packets, and the plurality of packets including a respective plurality of flags indicating whether a symbol included in a packet is an information word symbol or a parity symbol;
  receiving, by a reception apparatus, the plurality of packets over the network;
  determining that one or more packets are lost; and
  in response to determining that the one or more packets are lost,
    determining a number of the first packets and a number of the second packets based on the plurality of flags;
    determining, based on the numbers of the first packets and the second packets, a plurality of permutations of the plurality of packets and the one or more packets in which positions of the one or more packets in relation to positions of the plurality of packets are varied; and
    evaluating a permutation of the plurality of permutations to decode the information word symbols that are included in the plurality of packets,
  wherein the error detection collie is based on a different Error detection scheme than the parity symbols.

8. The system of claim 1, wherein the error detection code is a Cyclic Redundancy Check code for the information word symbols.

9. The method of claim 7, wherein the error detection code is a Cyclic Redundancy Check code for the information word symbols.

* * * * *